(12) United States Patent
Ma et al.

(10) Patent No.: US 8,233,493 B2
(45) Date of Patent: Jul. 31, 2012

(54) PACKET ROUTER HAVING IMPROVED PACKET CLASSIFICATION

(75) Inventors: Yadi Ma, Madison, WI (US); Suman Banerjee, Madison, WI (US); Cristian Estan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 394 days.

(21) Appl. No.: 12/555,462

(22) Filed: Sep. 8, 2009

(65) Prior Publication Data

US 2010/0067535 A1    Mar. 18, 2010

Related U.S. Application Data

(60) Provisional application No. 61/095,216, filed on Sep. 8, 2008, provisional application No. 61/097,406, filed on Sep. 16, 2008.

(51) Int. Cl.
*H04L 12/28* (2006.01)
*H04L 12/56* (2006.01)
(52) U.S. Cl. ............................................. 370/401
(58) Field of Classification Search .................... 370/401
See application file for complete search history.

(56) References Cited

U.S. PATENT DOCUMENTS

| 7,095,715 B2 * | 8/2006 | Buckman et al. | 370/230 |
| 7,193,997 B2 * | 3/2007 | Van Lunteren et al. | 370/392 |
| 7,274,700 B2 * | 9/2007 | Jin et al. | 370/392 |
| 7,424,018 B2 * | 9/2008 | Gallatin et al. | 370/389 |

OTHER PUBLICATIONS

Singh, Sumeet, et al., Packet Classification Using Multidimensional Cutting, SIGCOMM'03, Aug. 25-29, 2003 Karlsruhe Germany, ACM, New York, New York, USA.

* cited by examiner

*Primary Examiner* — Ayaz Sheikh
*Assistant Examiner* — Blanche Wong
(74) *Attorney, Agent, or Firm* — Boyle Fredrickson, S.C.

(57) ABSTRACT

A computer-implemented method for classifying received packets using a hardware cache of evolving rules and a software cache having an original rule set. The method including receiving a packet, processing the received packet through a hardware-based packet classifier having at least one evolving rule to identify at least one cache miss packet, and processing the cache miss packet through a software based packet classifier including an original rule set. Processing the cache miss packet includes determining whether to expand at least one of the at least one evolving rules in the hardware-based packet classifier based on the cache miss packet. The determination includes determining whether an evolving rule has both the same action and lies entirely within one of the rule of the original rule set.

13 Claims, 10 Drawing Sheets

PACKET ROUTER HAVING IMPROVED PACKET CLASSIFICATION

CROSS-REFERENCE TO RELATED APPLICATIONS

This application claims the benefit of U.S. Provisional Application No. 61/095,216 filed Sep. 8, 2008 and U.S. Provisional Application No. 61/097,406, filed Sep. 16, 2008, hereby incorporated by reference in its entirety.

STATEMENT REGARDING FEDERALLY SPONSORED RESEARCH OR DEVELOPMENT

This invention was made with United States government support awarded by the following agencies:
NSF 0627102, 0520152 and 0639434
The United States government has certain rights in this invention.

BACKGROUND

The present application relates to a system and method for packet classification. More specifically, the present application relates to a system and method implementing packet classification using a continuously updated cache of evolving rules.

Data packets received at a router input port are classified to determine an action to be performed on the packet. The action may include forwarding the packet, routing the packet to a particular application, providing expedited delivery of the packet, discarding the packet, etc. Packet classification is needed for services that require the capability to distinguish and isolate traffic (i.e., packets) in different flows for suitable processing. Exemplary services include packet filter, for example denying all packets from a known source, policy routing, for example routing all voice over IP traffic over a separate ATM network, traffic rate limiting, for example ensuring that any one source does not overload the network, etc. To implement the services, a packet classifier implements a series of rules that determine the action(s) to be taken for a packet based on header fields included in the packet.

A packet classifier matches several fields in the packet header of an incoming packet against a set of predefined rules. Exemplary fields include possible values of source and destination addresses, protocol fields, port numbers, etc. If all of the header fields associated with the packet match the corresponding ranges of a rule, the packet is considered to obey the rule and the action associated with the rule will be performed for that packet. For a specific packet, more than one rule can match the packet.

Accordingly, rules may be ranked by priority, such that the action associated with the highest rank rule will be performed for the packet.

Packet classification across multiple header fields may be a processor intensive operation. Packet classification algorithms are inherently limited by the tradeoff between memory usage and classification speed. A hardware based classification, such as Ternary Content Addressable Memory (TCAM), where the rule matching speed is considerably faster, has traditionally been used to the perform classification because of this limitation. However, hardware based classification is more expensive and consumes both more physical space and more power compared to packet classification algorithms. This is a significant disadvantage for mobile computing devices.

A "smart rule cache" that combines simple hardware and software has been used to provide a balance between the speed of hardware and the low expense of software. The hardware consists of a small on-chip cache, large enough to store one or more evolving rules, along with some simple logic to match incoming packets against the stored rules. The software component consists of algorithms by which the rules in the cache continuously evolve in response to changes in incoming traffic pattern.

Smart rule caches utilizes evolving rules that are semantically consistent with an original rule set meaning that packets classified using the evolving rules will be classified the same as they would under the original rule set. Smart rule caches generally include a small set of evolving rules. To maintain the small number of rules, a single evolving rule can overlap several rules of the original rule set, so long as the evolving rules remain semantically consistent. Evolving rules must be continually verified over the entire original rule set to ensure that they remain semantically consistent. One limitation for smart rules cache performance is the time required to re-compute the cached rules.

What is needed is a system and method for providing efficient packet classification that reduces the costs associated with evolving the cached rule set using an efficient smart rule caching system and method.

SUMMARY OF THE INVENTION

The present application is directed to a packet classification scheme similar to a smart rule cache but that requires that each evolving rule has both the same action and lies entirely within one of the rule of the original rule set. This difference allows the use of fasting cache updating using faster searching algorithms and conflict resolution. The smart rule cache is further configured to implement cache updating and rule verification using a HyperCuts decision tree and an algorithm for checking the HyperCuts tree to determine whether an expanded rule conflicts with the semantics of the original rules set.

The present application describes a computer-implemented method for classifying received packets using a hardware cache of evolving rules and a software cache having an original rule set. The method including receiving a packet, processing the received packet through a hardware-based packet classifier having at least one evolving rule to identify at least one cache miss packet, and processing the cache miss packet through software based packet classifier including an original rule set. Processing the cache miss packet includes determining whether to expand at least one of the at least one evolving rules in the hardware-based packet classifier based on the cache miss packet. The determination includes determining whether an evolving rule has both the same action and lies entirely within one of the rules of the original rule set.

These particular objects and advantages may apply to only some embodiments falling within the claims, and thus do not define the scope of the invention.

DETAILED DESCRIPTION OF THE PREFERRED EMBODIMENT

The present invention broadly discloses a method and apparatus for classifying packets. The present invention provides packet classification by using a "hyper rule" cache for storing a small number of rules that will evolve in accordance with defined properties based on the characteristics of the incoming traffic. The hyper rule cache is configured to require each evolving rule to have both the same action and lie entirely within one of the rules of the original rule set as described in further detail below.

Figure 1:
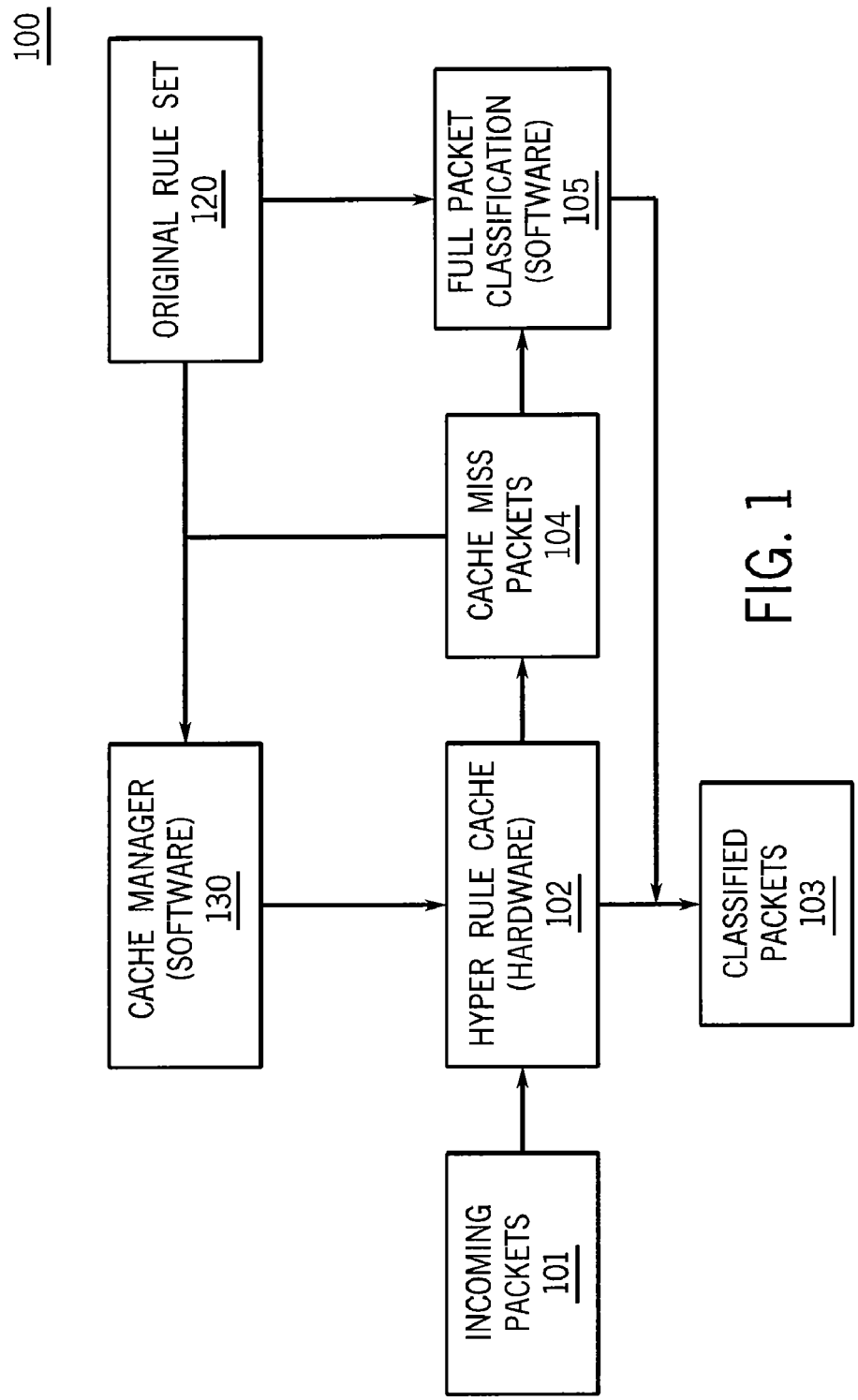
FIG. 1 is a computer-implemented system for performing packet classification using a hardware based cache and a software based cache, according to an exemplary embodiment.

Referring now to FIG. 1, a system 100 for performing packet classification is shown, according to an exemplary embodiment. In one embodiment, the system 100 contains a hardware-based hyper rule cache 102, a software-based full packet classifier 105, a cache manager 130, and an original rule set 120, comprising a set of classification rules.

Hyper rule cache 102 may be a cache implemented in a parallel TCAM memory to provide parallel cache matching. Cache 102 may be configured to contain a small number of cache entries each entry storing an evolving rule. Specifically, each cache entry may be a register storing the evolving rule and logic for matching incoming packets against the evolving rule, such as logic for matching one or more rule fields with one or more packet header fields. The TCAM may be designed to allow processing and matching each incoming packet to a rule in parallel.

The software-based full packet classifier 105 may be implemented in software and executed by a computer processor implementing system 100. The full packet classifier 105 may be configured to receive packets that were not classifiable using cache 102 and to classify these packets in accordance with original rule set 120. Original rule set 120 is generally a large set of rules that contains more rules for classifying packets than a stored in cache 102. An exemplary rule set and its usage in operation is described below with reference to FIG. 2. Because of the larger number of rules and because these rules are generally checked serially, classifying packets using full packet classifier 105 is generally a more processor intensive and time consuming operation.

Cache manager 130 is software for managing the evolving rules stored in cache 102. In accordance with the present system, cache manager 130 is configured to evolve and manage the evolving rules stored in cache 102 as will be discussed in further detail hereinbelow.

In operation, incoming packets 101 are processed by rule cache 102 for high speed, hardware based packet classification. Hyper rule cache 102 is configured to either identify the packet as a cache miss packet 104 to classify the packet as a cache hit packet 103 and to provide an action to be taken on the packet based on a cache hit. In one embodiment, the incoming packet 101 may be compared to all cache entries in cache 102 simultaneously. Accordingly, the cache entries are compared to the incoming packet in parallel and simultaneously report their result. To provide the parallel comparison, the parallel outputs of the cache entries may be provided to a bitwise OR logic gate to yield a final output of the rule cache. Since the number of cache entries is limited to a small number, hyper rule cache 102 matching may be implemented relatively quickly using a small TCAM which is more power efficient. Accordingly, hyper rule cache 102 separates successfully classified packets 103 from unclassified packets 104 (i.e., cache miss packets).

Cache miss packets 104 are forwarded to software based full packet classifier 105 which may identify some of the cache miss packets 104 using the original rule set 120. The full-fledged packet classifier 105 is only used in the event of cache misses, i.e., where the rules stored in the hyper rule cache are not able to properly classify the received packets 101. Although not shown, packet classifier 105 may also produce unclassifiable packets.

Cache miss packets 104, or a sampling thereof, are also provided to cache manager 130 to determine whether the rules stored in cache 102 should be updated to reduce the number of cache miss packets 104 being generated. Cache updates to the hyper rule cache 102 can be performed by re-writing the register entries in cache 102 that are carrying the evolving rules. More specifically, to evolve the rules to capture missed packets, the cache manager samples missed packets 104 since these packets may indicate that the rules stored in cache 102 may need to be changed based on a change in the characteristics of incoming packets 101. Reducing cache misses reduces the workload on the full packet classifier 105, which in turn may shorten packet classification delays.

Cache hit packets may also be sampled. In a sample interval, if a packet is a cache miss, it may be sampled immediately; else if it is a cache hit, cache manager 130 may check the next packet. Independent of whether this packet is a hit or miss, it is sampled. So when sampling, if two consecutive packets are cache hit, then the second one is sampled. Cache manager 130 may be configurable to control how often to sample a cache hit packet.

Referring now to FIGS. 2A-2F, a graphical representation of an exemplary original rule set and an example of how evolving rules are generated based on cache miss packets 104 is shown. All of FIGS. 2A-2F illustrate the original rule set with four rules shown in Table-1 in graphical form 200. Each of FIGS. 2A-2F illustrates an exemplary generation of an evolving rule set as new packets are received and compared to the rule set of Table 1.

In operation, cache manager 130 continually seeks to improve cache hit performance by placing the pertinent rules into the hyper rule cache 102 and/or dynamically evolving the rules already in the hyper rule cache in response to cache miss packets 104 and in view of the contents of the original rule set 120. The evolution of the rules stored in a rule cache may be performed by cache manager 130 based on received packets that resulted in cache misses. To provide an example of how rule evolution is implemented, Table 1 is an illustrative example of an exemplary original full rule set having 4 rules related to identifying packets 101 based on their packet headers. The rules shown in Table 1 include two fields: $F_1$ and $F_2$; and two actions permit and deny. This simplified original rule set may be used, for example, in a packet filtering operation.

TABLE 1

Simple Rule Set

| Rule | $F_1$ | $F_2$ | Action |
|---|---|---|---|
| R0 | 1-8 | 5-12 | Permit |
| R1 | 6-12 | 3-9 | Permit |
| R2 | 2-10 | 1-7 | Permit |
| R3 | 0-15 | 0-12 | Deny |

In Table 1, fields $F_1$ and $F_2$ may be fields which can be compared to the values stored in first and second packet header fields, respectively, to determine whether the packet satisfies the rule. The packet header fields may contain any type of information including, but not limited to, a source address, a destination address, a packet size, a packet type, etc. In this example, any packet having a first header field value between the range of 1 and 8 and a second header field value between the range of 5 and 12 would match rule R0 and the action "Permit" would be performed. Although ranges and numbers are used, it should be understood that the rules that use discrete values and any type of information to perform the matching operation. In this packet filtering example, a "Permit" action dictates that the packet is to be delivered to its destination address. In contrast, a "Deny" action dictates that the packet should be filtered and will not be delivered.

The rules in the original rule set may be ranked in order of priority such that an incoming packet 101 is matched to the first satisfied rule in the rule set. A packet may satisfy multiple rules; for example a packet with header fields 6 and 4 would match both R0 and R1, but would be matched to the highest priority rule in the rule set, in this case R0.

Referring to graphical representation 200, the two fields, $F_1$ and $F_2$, are represented along X- and Y-axes, respectively. The boxes 211, 212, 213 and 214 delineate the ranges of packet headers that will result in a match to rules R0, R1, R2 and R3, respectively. The boxes 211, 212 and 213 correspond to rules associated with a first action, Permit while the shaded box 214 corresponds to a rule with a second action, Deny. The boxes in FIG. 2 are further "stacked" in order of priority, i.e., since rule R0 is the highest priority rule, corresponding box 211 is shown in the foreground, while for rule R4, the lowest priority rule, corresponding box 214 is shown farthest into the background.

Referring also to FIG. 1, in operation, cache manager 130 constructs evolving rules based on the received packets that match most of the traffic volume instead of caching rules exactly as specified in the original rule set. For example, instead of caching rules R0, R1, R2 and R3, cache manager 130 may cache newly formed evolving rules. All evolved rules are based on the rule set represented by boxes 211-214, but may not be identical to any rule in the rule set. Moreover, the evolved rules may further evolve over time to reflect changing patterns in incoming traffic. The process of modifying rules or creating new rules to reflect changes in traffic pattern is referred to as rule evolution. FIGS. 2A-2F illustrate an example of evolving rule generation, each FIGure representing a newly received packet and the corresponding changes to the evolving rules.

Cache manager 130 is configured to construct evolving rules in a hyper rule cache 102 in accordance with five properties that all evolving rules are required to satisfy. Evolving rules in accordance with these properties may result in a larger evolving rule set in comparison with a traditional smart rule cache as described below with reference to FIG. 2E. However, constraining rule evolution according to these properties combines the benefits of a smart rule cache while also allowing faster cache updating using a HyperCuts decision tree as described below with reference to FIGS. 4 and 5.

The evolving rules in hyper rule cache 102 are required to satisfy five properties. First, each evolving rule represents a d-dimensional hypercube, which is referred to as the definition region of the rule. For the rule shown in Table 1, each evolving rule is shown and described herein as a 2-dimensional hypercube for simplicity, however, one of ordinary skill in the art would recognize that that a true rule may be represented as a closed, convex figure represent a rule space.

Second, each evolving rule is associated with a single action that is semantically consistent with the original rule set. For example, in Table 1, any evolving rule set based on the original rule set of rules R0-R2 would be associated with the Permit action, while an evolving rule associated with original rule R3 would be associated with the Deny action.

Third, each sample packet in the sliding window data structure 300 is assigned to one evolving rule that matches it. The weight of each evolving rule, stored in each node of data structure 305, is defined to be its number of assigned data packets. These properties are consistent with the properties traditionally used for smart rule caches.

The above listed properties are common to both the hyper rule cache 102 of the present invention and smart rules caches. However, the fourth and fifth properties are unique to hyper rule caches. The fourth property requires that evolving rules either have the same action or are non-overlapping. This property guarantees that the ordering of evolving rules in rule cache 102 is not important. For example, when a packet arrives, cache manager 130 determines an evolving rule to be expanded (if the rule exists). Suppose two existing evolving rules r1 and r2 could be expanded without confliction. Cache manager 130 may expand evolving rule r1; or rule r2. Therefore, cache manager 130 may place each evolving rule in an arbitrary cache entry.

The fifth property requires that each evolving rule lies entirely inside a single one of the rules in the original rule set. For example, cache manager 130 defines an evolving rule r to be $\{[l_1, h_1], [l_2, h_2], \ldots, [l_d, h_d]\}$ where $l_i$ and $h_i$ are lower and higher bounds on filed i, $0<=i<=d$. Cache manager 130 defines an original rule R in the rule set to be $\{[L_1, H_1], [L_2, H_2], \ldots, [L_d, H_d]\}$. Similarly $L_i$ and $H_i$ are lower and higher bounds on filed i, $0<=i<=d$. Cache manager 130 determine that r lies entirely inside R if for each i ($0<=i<=d$), $L_i<=l_i<=h_i<=H_i$. In a hyper rule cache, if an evolving rule overlaps with multiple rules in the original rule set, and these rules have the same action, the evolving rule should lie entirely inside one of these rules. Otherwise, if these rules have different actions, the evolving rule should lie entirely inside the highest priority rule that it matches.

Figure 2A:
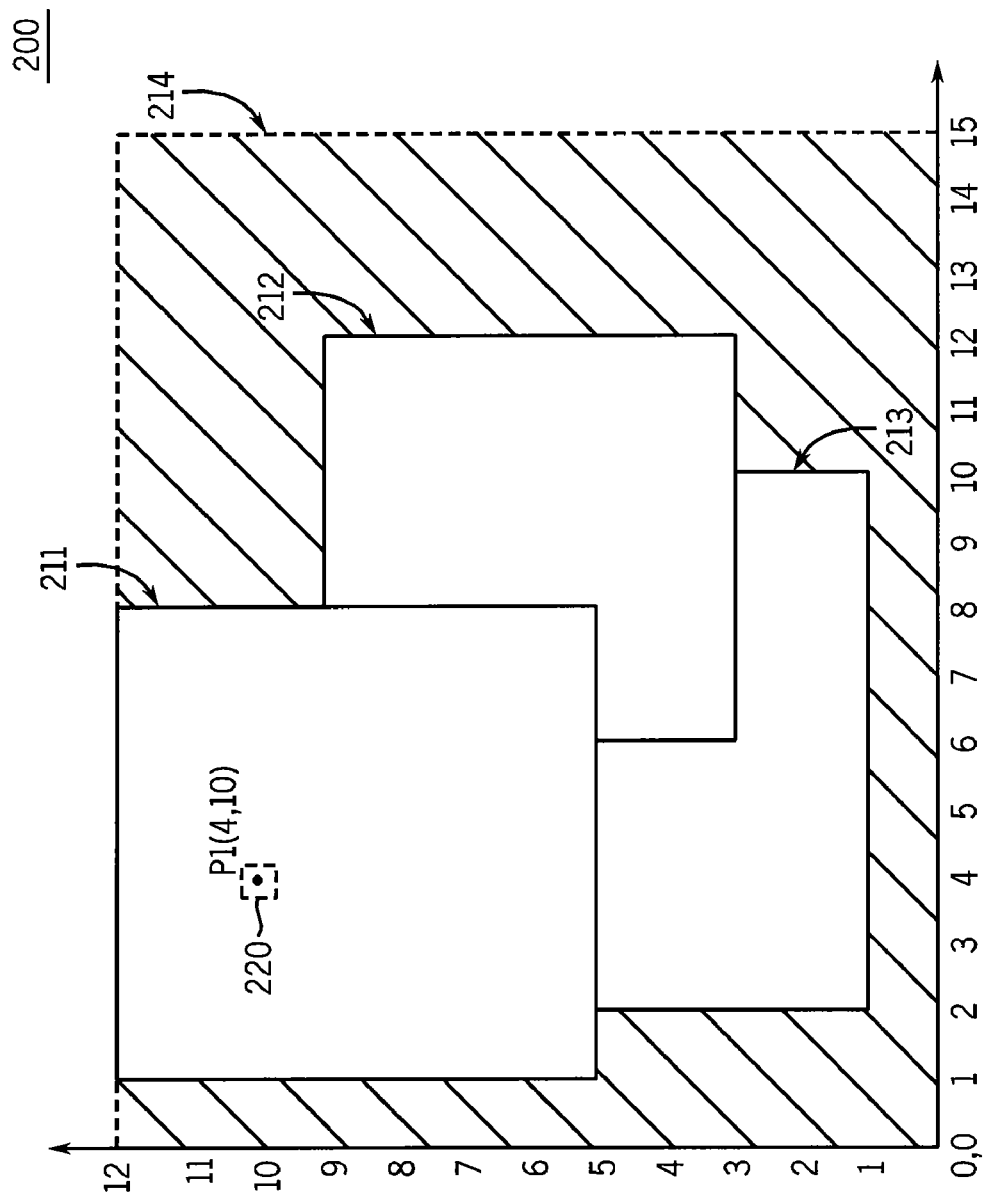
FIGS. 2A-E are graphical representations of a rule set with four rules shown in Table-1 in graphical form and an evolving rule set constructed using a hype rule cache, according to an exemplary embodiment.

As shown in FIG. 2A, when a first packet labeled P1 and having header fields of (4, 10), arrives, there is no evolving rule existing and P1 becomes the first evolving rule 220 created by cache manager 130. The first evolving rule 220 will state that all packets having the header of (4, 10) will have the action Permit. This rule is entirely within the original rule set for the first action represented by boxes 211-213. Note that all packets that do not match the current cached rules need to be matched against the original set of rules in the packet classifier such that rules stored in the hyper rule cache 102 are semantically consistent with the original rule set 120 of the full packet classifier 105 such that a packet being classified using rules cache 102 will be associated with the same action as the packet would be matched with if it were being identified using the full packet classifier 105 and original rule set 120.

Figure 2B:
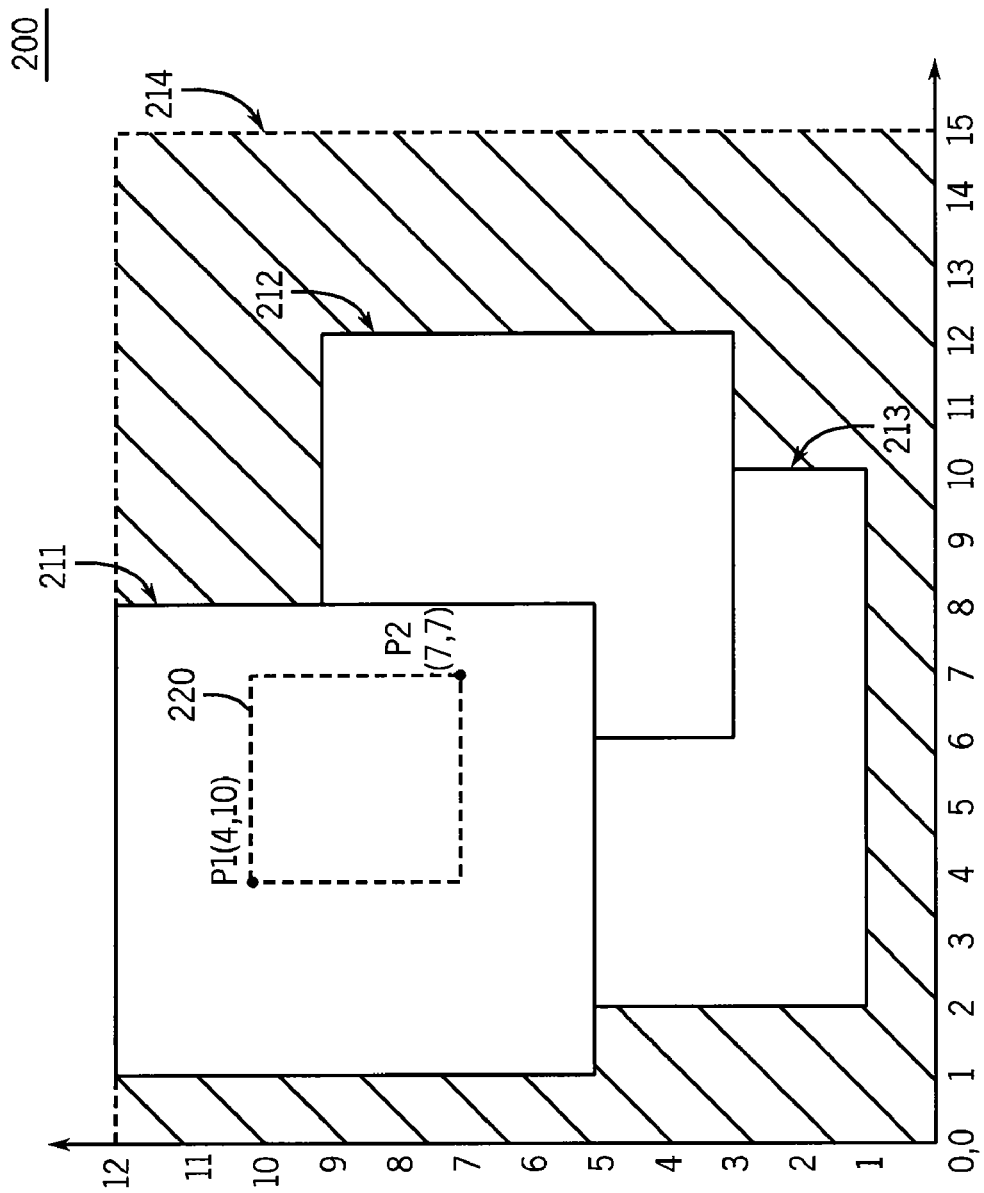

Referring now to FIG. 2B, a second packet labeled P2 and having header (7, 7) is received having the same action as first evolving rule 220. Accordingly, cache manager 130 attempts to expand the first evolving rule 220. Since the expanded rule 220, stating that all packets having the header of (4-7, 7-10) will have the action Permit does not conflict with the semantics of the original rule set (i.e., it is still within boxes 211-213), the first evolving rule can be expanded as shown in FIG. 2B.

Figure 2C:
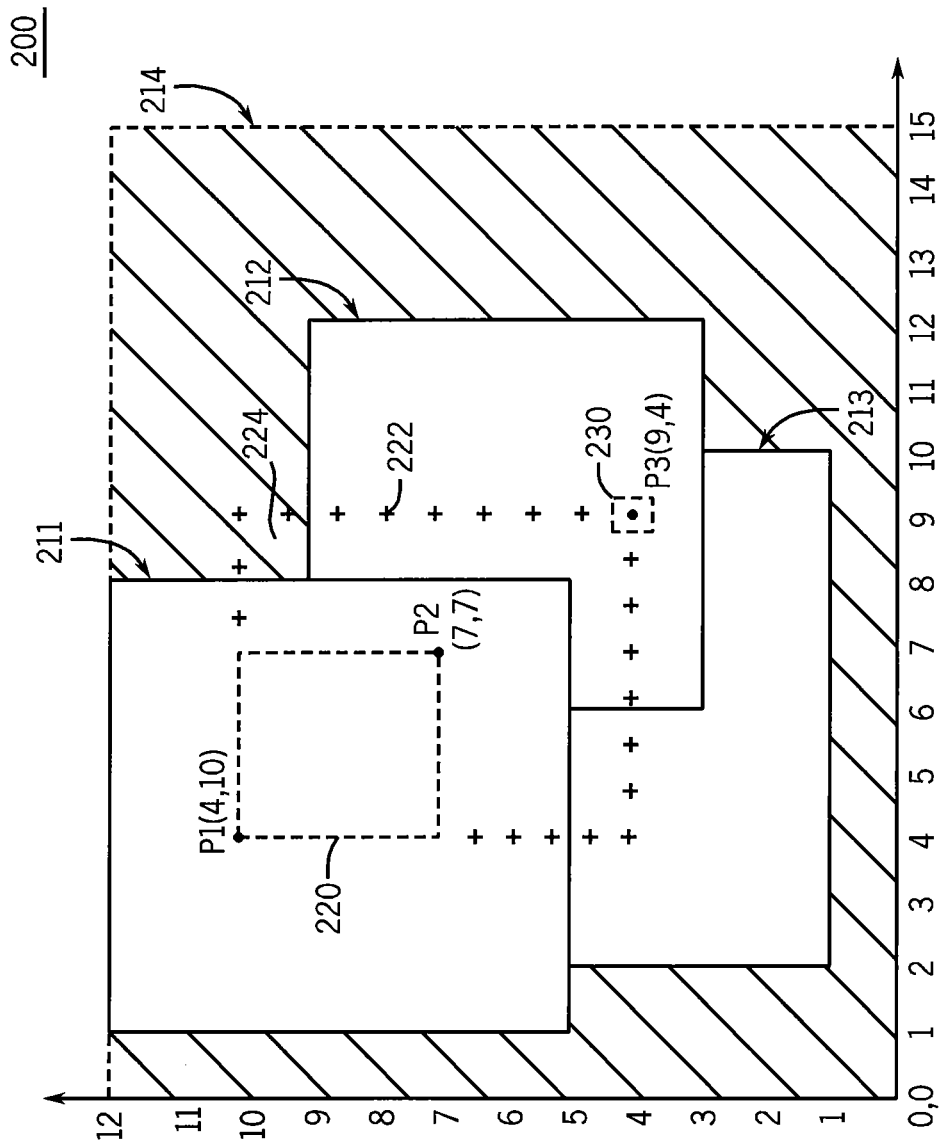

Referring now to FIG. 2C, a third packet labeled P3 and having header (9, 4) is received having the same action as the first evolving rule. However, a proposed evolving rule 222 is found to conflict with the properties requiring that all evolving rules are consistent with the original rule set. Specifically, the first evolving rule 220 cannot be expanded based on the third packet P3 since an evolving rule associating with the first action with all packets having the header (4-9, 4-10) would conflict with the original rule set 120 (i.e., in FIG. 2C, the resultant proposed evolving rule 222 for this evolving rule would include a shaded area portion 224 associated with the deny action). Accordingly, rather than expanding the first evolving rule 220, cache manager 130 forms a second evolving rule 230 stating that all packets having the header of (10, 4) will be permitted.

Figure 2D:
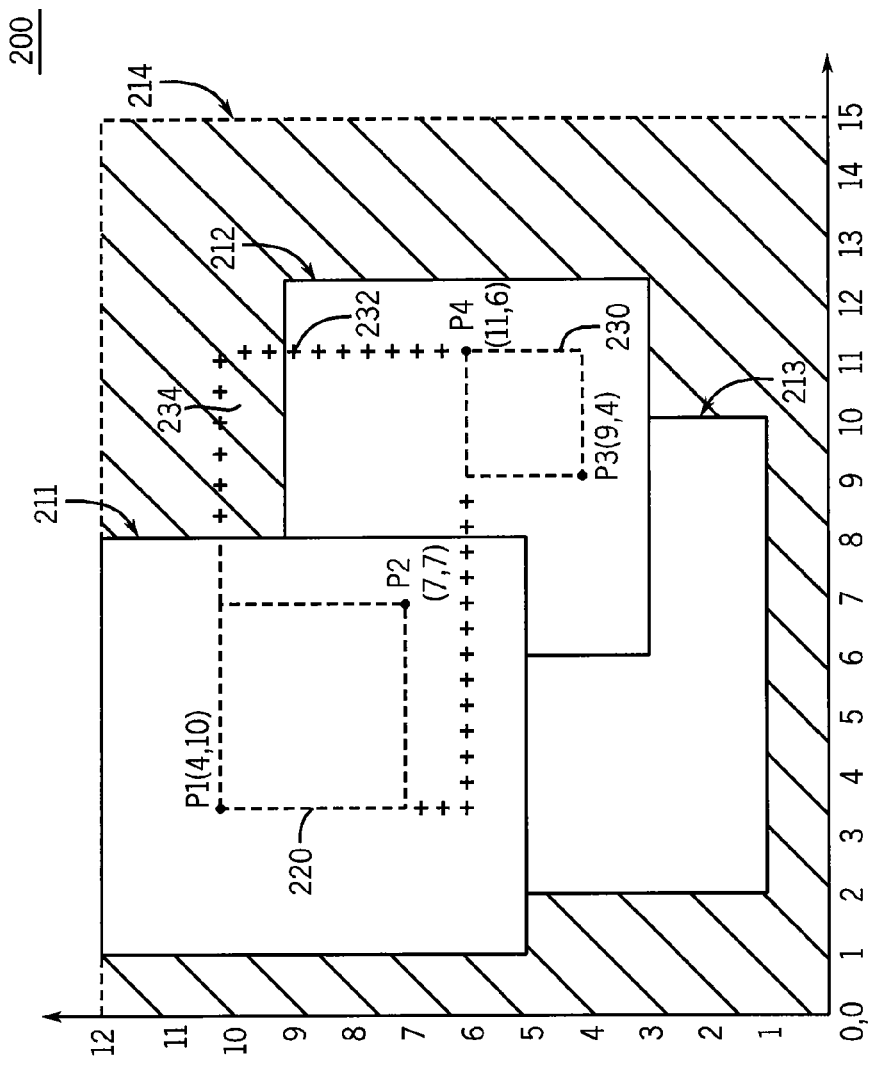

Referring now to FIG. 2D, a fourth packet labeled P4 and having header (11, 6), is received having the same action as the first evolving rule. Cache manager 130 will attempt to evolve the highest priority rule to match the newly received packet. However, for packet P4, similar to packet P3, a proposed evolving rule 232 is found to conflict with the properties requiring that all evolving rules are consistent with the original rule set. Specifically, the first evolving rule 220 cannot be expanded based on the fourth packet P4 since an evolving rule associating with the first action with all packets having the header (4-11, 6-10) would also conflict with the original rule set 120 (i.e., in FIG. 2D, the resultant proposed evolving rule 232 for this evolving rule would include a shaded area portion 234 associated with the deny action). Accordingly, cache manager 130 searches for the first evolving rule in the evolving list that has the same action as itself and can be successfully expanded, the second evolving rule 230 in the example shown, and expands this rule, stating that all packets having the header of (9-11, 4-6) will have the action Permit.

Figure 2E:
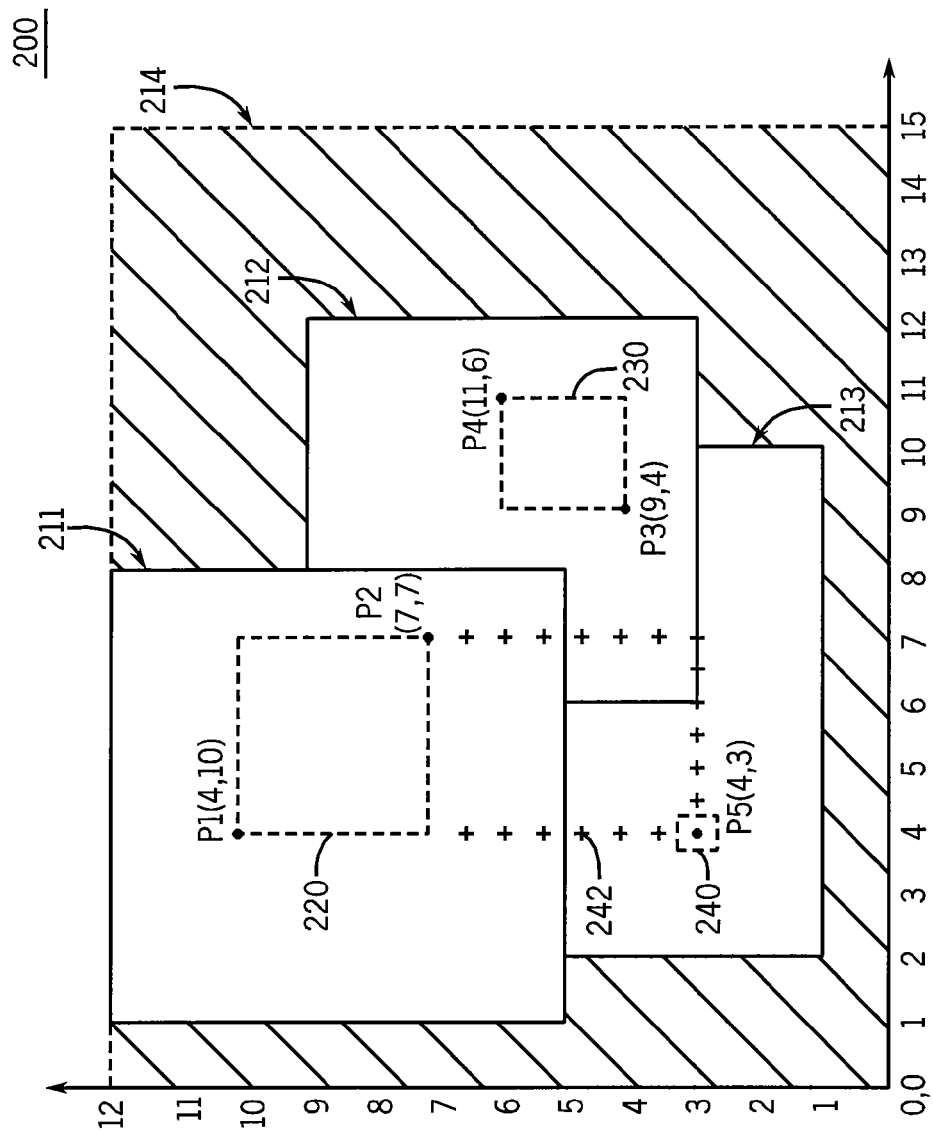

Referring now to FIG. 2E, a fifth packet labeled P5 and having header (4, 3) is received having the same action as the first evolving rule. This packet has the same action as the first evolving rule and a proposed expansion 242 of the first evolving rule is semantically consistent with the original rule set. However, proposed expansion 242 is in conflict with the fifth property for hyper rule expansion, requiring that each evolving rule lies entirely inside a single one of the rules in the original rule set. The proposed expansion 242 is not entirely within either box 211, corresponding to rule R0, nor box 213, corresponding to rule R2. Evolving the second evolving rule 230 would cause a similar conflict. Accordingly, rather than expanding the first or second evolving rule 220 and 230, cache manager 130 forms a third evolving rule 240 stating that all packets having the header of (4, 3) will be permitted.

It is important to note that under the expansion rules of a traditional smart rule cache, the first evolving rule can be expanded to lie within multiple rules (e.g., rules R0 and R2 of the original rule set). Accordingly, using a traditional smart rule cache, first evolving rule 220 would be expanded to be proposed evolving rule 242. This expansion would minimize the number of rules stored within rules cache 102. However, traditional smart rules caching is limited by the time required to update the rules cache 102. The faster the cache manager 130 updates the rules cache 102, the lower the number of cache miss packets 104. Using traditional evolving rule generation and expansion, verification of evolving rules is done by checking the decision of each leaf node in a standard packet decision diagram (SPDD) or pruned packet decision diagram (PPDD). However, with a large original rule set (some rule sets contain 1000-2000 rules), the resulting SPDD/PPDD is very large. For example, for a real rule set of 1802 rules, a PPDD tree has 26992241 nodes. This results in a huge memory space and a relatively long cache update time.

Restricting evolving rules to lie entirely within one rule of the original rule set allows usage of the HyperCuts decision tree which will greatly increase the speed of cache updates. Restricting evolving rules to lie entirely within one rule of the original rule set makes searching for conflicts much faster when expanding evolving rules. Previously, when using SPDD tree in smart rule cache, checking conflicts involved checking a large number of overlapping nodes in the tree. By restricting evolving rules to lie entirely within one rule, the number of nodes to be checked in HyperCuts tree is greatly reduced. Additionally, each leaf nodes in a HyperCuts tree contains a small and ordered list of original rules, usually cache manager 130 only need to check part of the rules for conflicts with the original rule set. For example, if an expanded rule conflicts with an original rule R, then other original rules that have lower priority than R do not need to be checked. Using the five properties allows faster cache updating although at the cost of having a greater number of rules in rule cache 102.

As described, to implement evolving rule generation and updating, cache manager 130 is configured to receive and store missed packets 104 used to indicate a need to update the evolving rules in rule cache 102. Further, cache manager 130 is configured to generate and store proposed evolving rules pending determination of whether the proposed evolving rules would conflict with the five properties described above.

Figure 3:
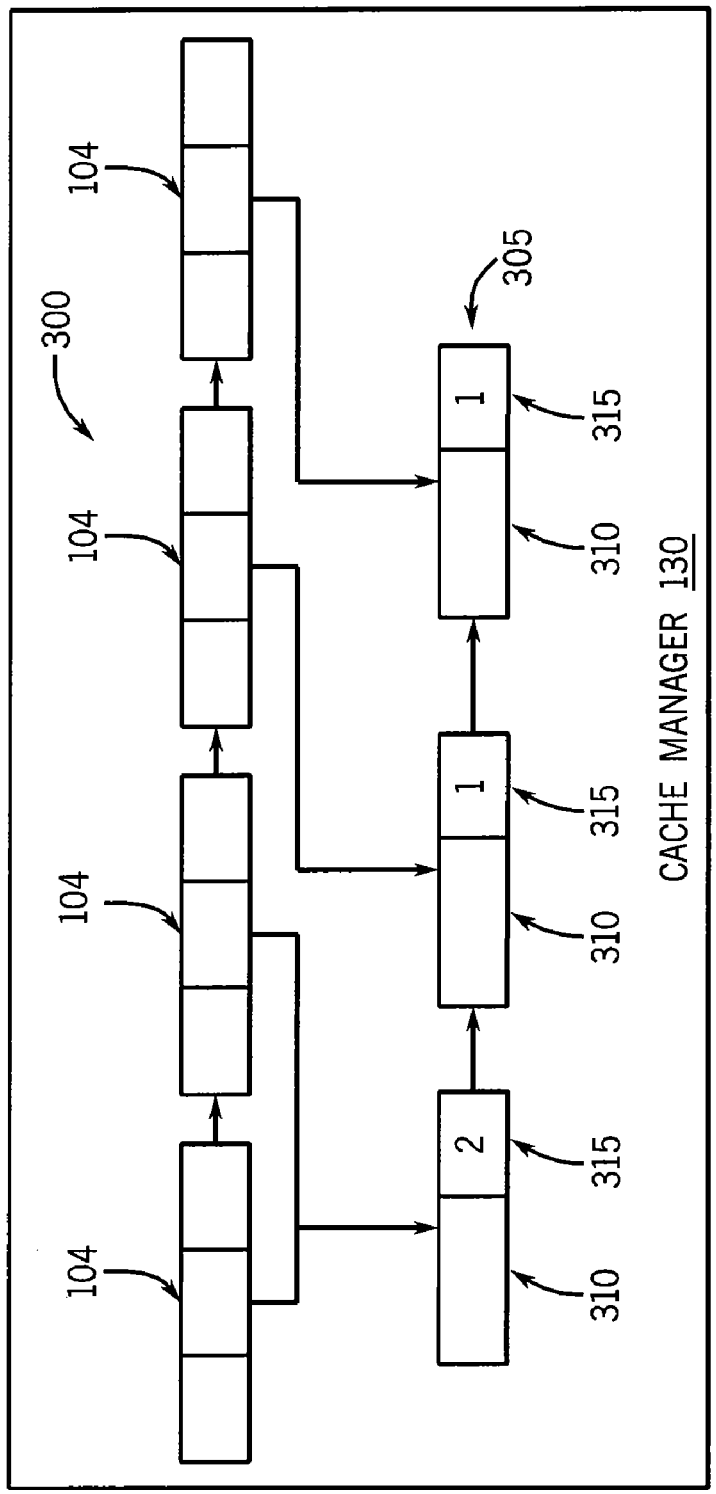
FIG. 3 is a graphical representation of two data structures used by the cache manager to maintain the evolving rules, according to an exemplary embodiment.

Referring now to FIG. 3, a graphical representation of two data structures used by the cache manager 130 to evolve the rules stored in cache 102 is shown, according to an exemplary embodiment. The data structures may be used to store cache miss packets 104 and to store evolving rules that are being checked for validity (discussed below with reference to FIG. 7) prior to their inclusion in cache 102.

In operation, a sliding window data structure 300 may be used by cache manager 130 to store sampled cache miss packets 104 and to determine relevant statistics (such as frequency of misses, type of cache misses, reasons for cache misses, etc.) for the evolving rules. Data structure 300 may be implemented as a first in, first out (FIFO) queue of a number of sample packets. The number of packets stored in data structure 300 may be referred to as the sliding window size. Increasing the sliding window size will increase the number of evolving rules. Generally, a sliding window of size 1024 will result in about 20 evolving rules.

Cache manager 130 further maintains a proposed evolving rules list data structure 305 including one or more proposed evolving rules 310. In operation, cache manager 130 may be configured to generate evolving rules 310 based on the cache miss packets 104 stored in data structure 300 as described above with reference to FIGS. 2A-2E. Each evolving rule 310 stored in structure 305 that has been checked for conflicts may be transferred into the rules cache 102 during a cache update. Each evolving rule 310 in structure 305 may be configured to include a rule weighting field 315. Cache manager 130 uses the weighting field 315 to maintain a list of evolving rules stored in hyper rule cache 102 and to determine which rules should be switched in or out or modified in the hyper rule cache 102 in order to maximize a cache hit ratio. The evolving rules are ordered by weights stored in weighting field 315. The weights are updated upon the insertion and deletion of each sample packet in the sliding window. If the weight of an evolving rule falls down to 0, then the evolving rule is deleted from the rule list 305. Deleting non-weighted evolving rules helps to keep the size of rule cache small.

Cache manager 130 may be configured to search and attempt to match received packets to rules stored in rules cache 102 using a HyperCuts decision tree instead of the traditional SPDD/PPDD trees to perform conflict checking for proposed evolving rules. Using a HyperCut decision tree in combination the properties governing the expansion of evolving rules, discussed above with reference to FIGS. 2A-2E, can significantly reduce cache update times.

Figure 4:
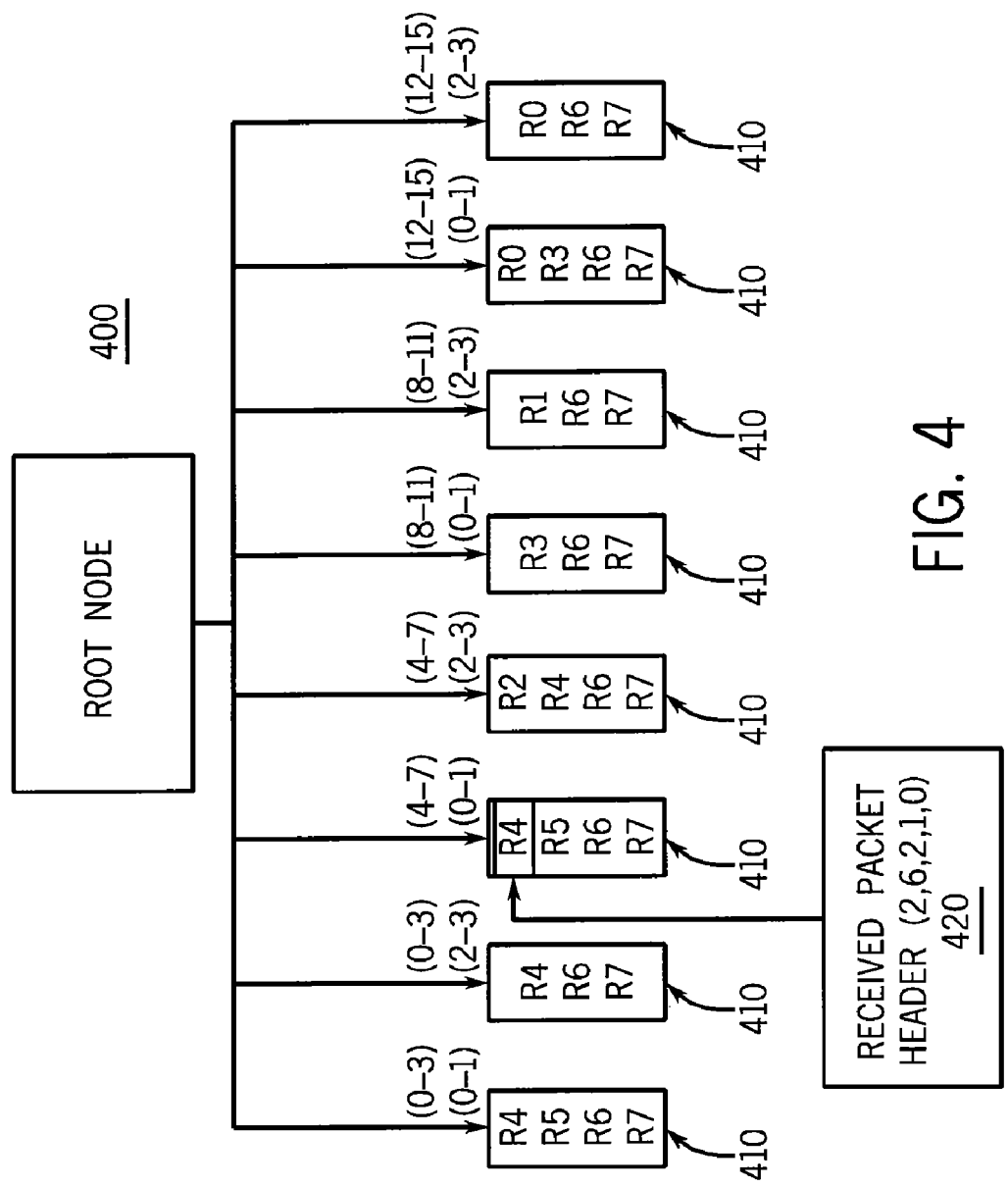
FIG. 4 is a graphical representation of a search of a decision tree based on a received sample packet header, according to an exemplary embodiment.

Referring now to FIG. 4, an exemplary HyperCuts decision tree 400 for an eight rule original rule set is shown, according to an exemplary embodiment. Using HyperCuts, each time a packet arrives, the decision tree 400 is traversed based on information in the packet header to find a leaf node 410 matching the packet header information. A small number of matching rules that are stored in the leaf node 410 are then linearly traversed to find the highest weighted rule that matched the packet.

The HyperCuts decision tree may be built and maintained by cache manager 130 in a manner that is known in the art. To construct the HyperCuts decisions tree, cache manager 130 starts with a set of N rules of an original rule set, each rule containing K fields. If the size of the set of rules in larger than a predefined size for each leaf node, the set is split into a number of child nodes, where each child node contains a sub-region of the region of its parents. The number of children is called the number of cuts. In order to locally optimize the distribution of rules, among child nodes, splitting criteria are used to determine first which fields are to be cut and second how many cuts to be done in each chosen field.

For example, a Hypercuts decision tree 400 illustrated in FIG. 4 represents a decision tree for a rule set containing 8 rules having a range matching criteria. The range based rules are shown in Table 2:

TABLE 2

Range representation matching rules set

| Rule | Field 1 | Field 2 | Field 3 | Field 4 | Field 5 | Action |
|---|---|---|---|---|---|---|
| R0 | 0-1 | 14-15 | 2 | 0-3 | 0 | Action0 |
| R1 | 0-1 | 8-11 | 1 | 2 | 1 | Action1 |
| R2 | 0-1 | 4-7 | 0-3 | 3 | 1 | Action0 |
| R3 | 0-7 | 8-15 | 0-3 | 1 | 0 | Action2 |
| R4 | 0-7 | 0-7 | 2 | 0-3 | 0 | Action1 |
| R5 | 0-1 | 0-7 | 0-3 | 1 | 0 | Action1 |
| R6 | 0-15 | 0-15 | 0-3 | 0-3 | 0 | Action3 |
| R7 | 0-15 | 0-15 | 0-3 | 0-3 | 1 | Action4 |

According to an exemplary embodiment, the number of cuts and size of the cuts may be made based on a mean of the number of unique elements in the set of rules. For example, referring to Table 2, for Field 1, there are three unique elements (namely 0-1, 0-7, and 0-15). The number of unique elements in Field 1 through Field 5 of Table 2 is 3, 6, 3, 4 and 2, respectively. Accordingly, the mean number for the fields is 3.2, meaning that Fields 2 and 4 are good candidates for leaf node indices. Referring to Table 2 and as shown in FIG. 4, there are eight unique combinations of Fields 2 and 4. Thus, the set of fields is split into eight leaf nodes 410 correlating to the number of unique combinations of Fields 2 and 4 occurring in Table 2. Each leaf node 410 is labeled with the subset of Fields 2 and 4 that correlate to the rules within that leaf node. Each leaf node 410 also contains a number of Rules, the rules ordered in terms of rule weighting or priority. Some rules may be contained within multiple leaf nodes 410.

FIG. 4 further illustrates a search of the decision tree 400 based on a received sample packet 420 having header fields of (2, 6, 2, 1, 0). Cache manager 130 implements a search engine to identify a particular leaf node 410 based on the packet header 420. In this instance, the packet header matches the leaf node associated with 4-7 for Field 2 and 0-1 for Field 4. The highest priority rule matching the packet header, in this case Rule R4, is returned.

System 100 defines a packet classification system using a hyper rule decision tree where the cache manager 130 is configured to implement a rule evolution method in accordance with the five properties discussed above with reference to FIGS. 2A-2E, to construct evolving rules in a hyper rules cache 102. Cache manager 130 is configured to implement a conflict checking method to determine whether a proposed evolving rule conflicts with the semantics of the original rule set or the five properties.

Figure 5:
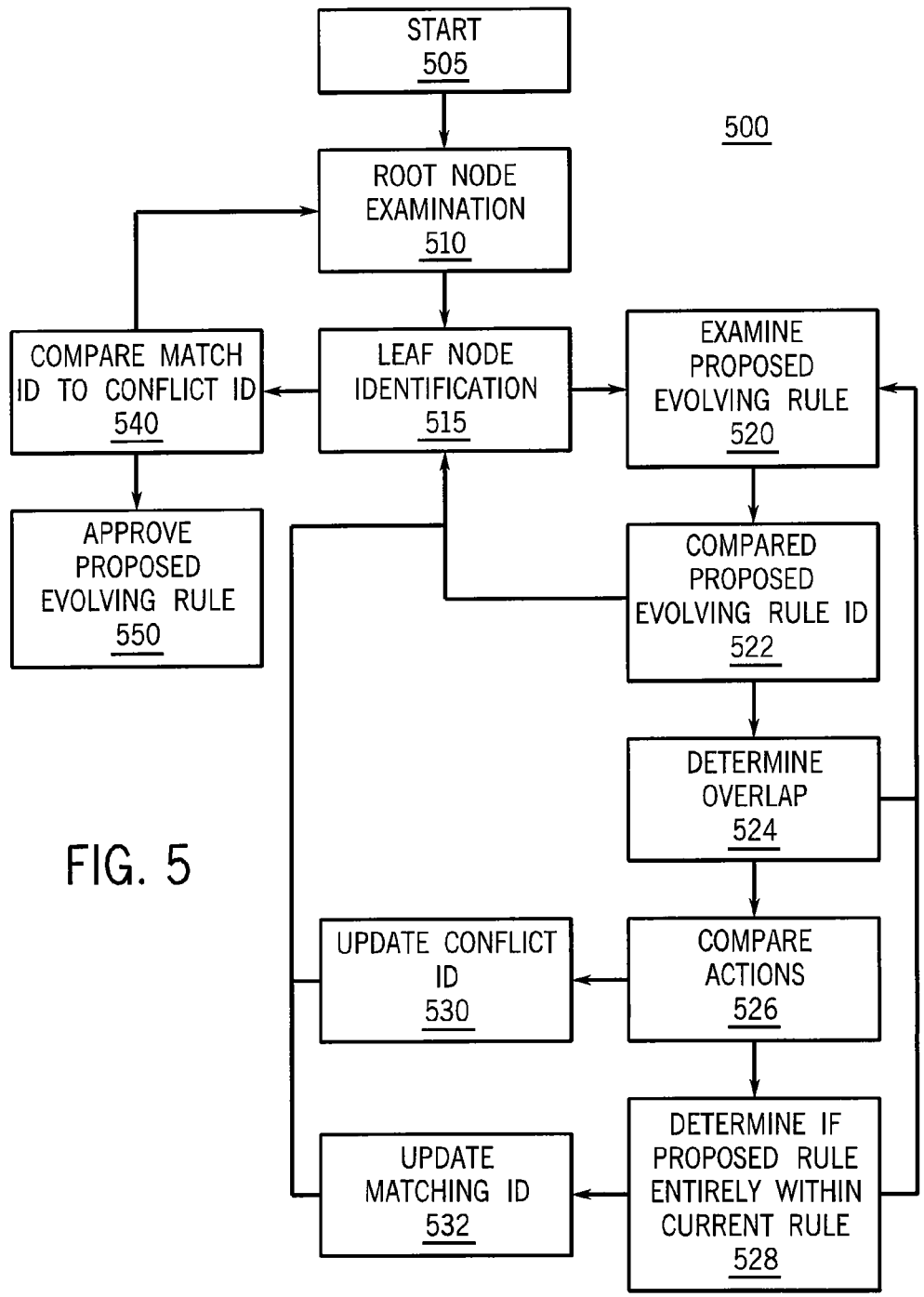
FIG. 5 is a graphical representation of a computer-implemented method for checking expanded rules for conflict using the packet classification system having a hyper rule cache, according to an exemplary embodiment.

Referring now to FIG. 5, a method 500 for checking proposed evolving rules for conflict with the five expansion rule properties using the packet classification system 100 is shown, according to an exemplary embodiment. Method 500 may be a recursive method to determine whether a rule is in conflict with any of the five properties of the hyper rule cache. Method 500 may be implemented by cache manager 130 to determine whether an evolving rules can be expanded based on a miss cache packet 104 consistent with the five hyper rule cache rule expansion properties.

Method 500 starts in step 505 and proceeds to step 510 where cache manager 130 begins the review of an expanded rule with an examination of the root node of the HyperCuts decision tree to identify leaf nodes having rules that overlap with the expanded rule. During the review, two types of rules identifications (ID) are sought, a matching rule (ID) and a conflict rule (ID). A matching rule is a rule that has the same decision as the expanded rule where the expanded rule lies entirely within the matching rule. A conflict rule is a rule that has different actions from the expanded rule and overlaps with the expanded rule. Both the matching rule ID and the conflict rule ID are initialized to the total number of rules in the original rule set.

In a step 515, cache manager 130 identifies a leaf node having a number of rules from the original rule set to be checked against the expanded rule. In a step 520, a current rule is examined. In a step 522, a determination is made whether the current rule ID is less than the minimum of the matching rule ID and the conflict rule ID. If the ID of the current rule is larger, it is not necessary to check this rule or any other rules in the leaf node and cache manager 130 returns to step 515 to identify other leaf nodes to be examined. If the current rule ID is larger, it is a lower priority rule. If an expanded rule has already conflicted or matched a higher priority rule, cache manager 130 does not need to check rules that have lower priorities. Essentially, the highest priority rule determines the decision if an expanded rule. Further, the rules in a leaf node are ordered by priority, such that cache manager 130 does not need to check all the other rules in a leaf node if a conflict or match is found since they will all have lower priorities.

If the current rule ID is smaller than the minimum of the matching rule ID and the conflict rule ID, the algorithm check whether the current rule overlaps with the proposed evolving rule in a step 524. If yes, a determination is made whether the action of the current rule matches the action of the proposed evolving rule in a step 526. If the actions are different, this means that the rules overlap, but have different decisions and the conflict rule ID is updated to be the current rule ID in a step 530 and cache manager 130 returns to step 515.

If the actions are the same in step 526, cache manager 130 is configured to check whether the proposed evolving rule lies entirely inside the current rule in a step 528. If the proposed evolving rule does lie entirely inside the current rule, the matching rule ID is updated to be the current rule ID in a step 532 and cache manager 130 returns to step 515. If not, cache manager examines the next rule returning to step 520.

Using the method 500, cache manager 130 iteratively examines all of the child nodes having rules that overlap with the proposed evolving rule. Following the iterative examination of the child nodes, a determination is made in a step 540 whether the matching rule ID is less that the conflict rule ID. If yes, there is no conflict and the proposed evolving rule is approved and expanded in a step 550. If no, the proposed evolving the rule is not permitted under the five properties and the next rule in the expanded rule list is checked in step 510.

Figure 6:
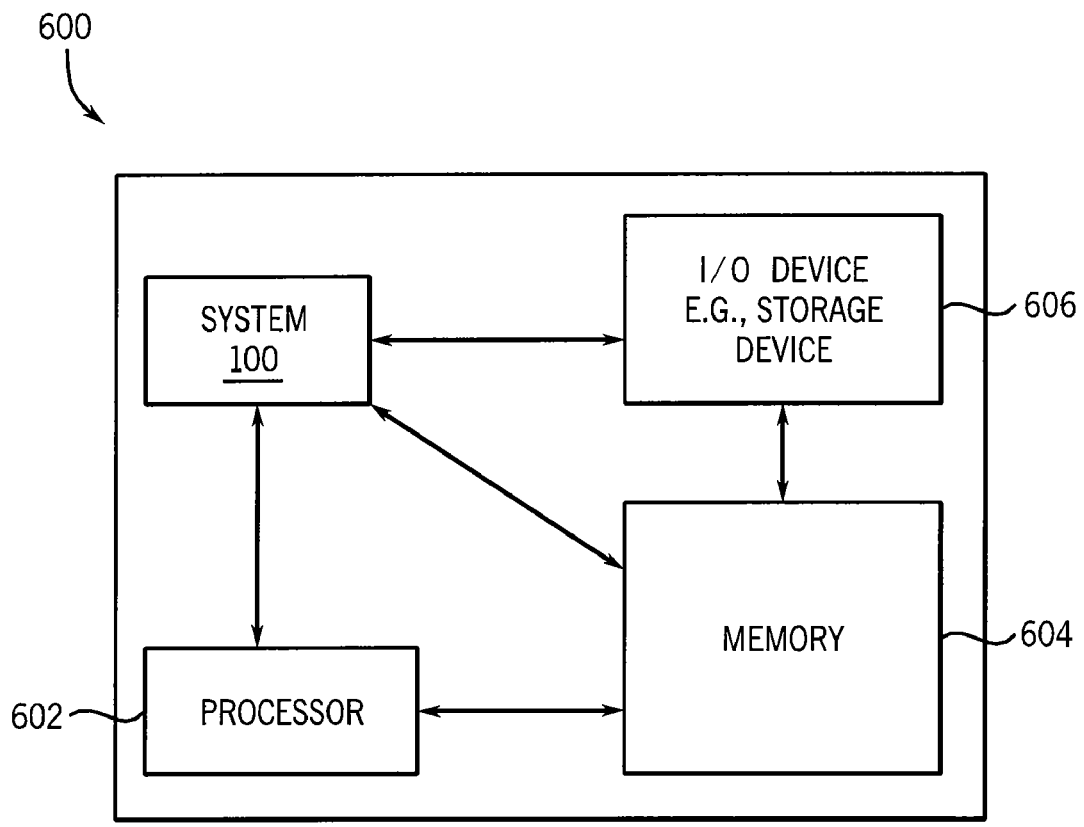
FIG. 6 is a high level block diagram of a general purpose computer suitable for use in performing the functions described herein, according to an exemplary embodiment.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 100 for classifying packets, and various input/output devices 606 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 100 for classifying packets can be loaded into memory 604 and executed by processor 602 to implement the functions as discussed above. As such, the present method 100 for classifying packets (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. For example, although the present invention is discussed herein in the context of Internet Protocol (IP) networks, the present invention may be applied to any packet based network including, but not limited to, cellular networks, Asynchronous Transfer Mode (ATM) networks, etc. For the purpose of scope, the term packet is intended to broadly include a data unit of any size or type, e.g., a record and the like. Thus, the breadth and scope of a preferred embodiment should not be limited by any of the above-described exemplary embodiments, but should be defined only in accordance with the following claims and their equivalents.

It is specifically intended that the present invention not be limited to the embodiments and illustrations contained herein, but include modified foams of those embodiments including portions of the embodiments and combinations of elements of different embodiments as come within the scope of the following claims.

We claim:

1. A computer-implemented method for classifying received packets, comprising:
    receiving a packet;
    processing the received packet through a hardware-based packet classifier having at least one evolving rule that determines an action to be taken based on a header field in the received packet to identify at least one cache miss packet that cannot be classified by the classifier;
    processing the at least one cache miss packet through a software based packet classifier including an original rule set; and
    determining whether to expand the at least one evolving rule in the hardware-based packet classifier based on the result of the processing of the at least one cache miss packet, the determination including determining whether an evolving rule has both the same action and lies entirely within one of the rules of the original rule set,
    wherein said hardware-based packet classifier comprises at least one rule cache for storing said at least one evolving rule,
    wherein said at least one evolving rule is updated periodically based on the cache miss packets, and
    wherein a cache miss packet is a packet that is unable to be classified by said hardware-based packet classifier.

2. The method of claim 1, wherein said at least one evolving rule is updated in accordance with the at least one cache miss packets based on a weighting associated with a cache miss packet.

3. The method of claim 1, wherein the at least one evolving rule is updated to minimize a cache miss ratio.

4. The method of claim 1, wherein said at least one evolving rule is updated in accordance with a data structure having a plurality of evolving rules.

5. The method of claim 4, wherein the at least one cache miss packet is evaluated to determine whether an order of said plurality of evolving rules in said data structure needs to be updated.

6. The method of claim 1, wherein said at least one rule cache comprises two or more rules caches to allow hot-swapping between said two or more rules caches.

7. The method of claim 1, wherein said software-based packet classifier comprises a plurality of rules associated with packet classification comprising the original rule set and wherein each of the at least one evolving rule must be semantically consistent with the original rule set.

8. A non-transitory computer-readable medium having stored thereon a plurality of instructions, the plurality of instructions including instructions which, when executed by a processor, cause the processor to perform the steps of a method for classifying packets, comprising:
    receiving a packet;
    processing the received packet through a hardware-based packet classifier having at least one evolving rule that determines an action to be taken based on a header field in the received packet to identify at least one cache miss packet that cannot be classified by the classifier;
    processing the at least one cache miss packet through a software based packet classifier including an original rule set; and
    determining whether to expand the at least one evolving rule in the hardware-based packet classifier based on the result of the processing of the at least one cache miss packet, the determination including determining whether an evolving rule has both the same action and lies entirely within one of the rules of the original rule set, wherein said hardware-based packet classifier comprises at least one rule cache for storing said at least one evolving rule, wherein said at least one evolving rule is updated periodically based on the cache miss packets, and wherein a cache miss packet is a packet that is unable to be classified by said hardware-based packet classifier.

9. The computer-readable medium of claim 8, wherein said at least one evolving rule is updated in accordance with the at least one cache miss packets based on a weighting associated with a cache miss packet.

10. The computer-readable medium of claim 8, wherein said at least one evolving rule is updated to minimize a cache miss ratio.

11. The computer-readable medium of claim 8, wherein said at least one evolving rule is updated in accordance with a data structure having a plurality of evolving rules.

12. The computer-readable medium of claim 11, wherein the at least one cache miss packet is evaluated to determine whether an order of said plurality of evolving rules in said data structure needs to be updated.

13. The computer-readable medium of claim 8, wherein said software-based packet classifier comprises a plurality of rules associated with packet classification comprising the original rule set and wherein each of the at least one evolving rule must be semantically consistent with the original rule set.

* * * * *